ELECTRONIC TIMEPIECE

Original Filed June 22, 1965 2 Sheets-Sheet 1

INVENTORS
JULIAN LAZRUS
LEWIS H. STRAUSS
BY WILLIAM P. CANNING
James and Franklin
ATTORNEYS

ELECTRONIC TIMEPIECE

Original Filed June 22, 1965 2 Sheets-Sheet 2

INVENTORS
JULIAN LAZRUS
LEWIS H. STRAUSS
BY WILLIAM P. CANNING
James and Franklin
ATTORNEYS

United States Patent Office

Re. 26,958
Reissued Sept. 29, 1970

26,958
ELECTRONIC TIMEPIECE

Julian Lazrus, Westport, Conn., Lewis H. Strauss, Washington, D.C., and William P. Canning, Pico Rivera, Calif., assignors to Benrus Corporation, a corporation of Delaware Original No. 3,370,414, dated Feb. 27, 1968, Ser. No. 465,907, June 22, 1965. Application for reissue Mar. 10, 1969, Ser. No. 808,026

Int. Cl. G04c *3/00*

U.S. Cl. 58—23 20 Claims

Matter enclosed in heavy brackets [ ] appears in the original patent but forms no part of this reissue specification; matter printed in italics indicates the additions made by reissue.

*ABSTRACT OF THE DISCLOSURE*

*An electronic timer comprises a radioactive source from which radioactive events having a predetermined energy are allowed to reach counting means and a frequency reducing network reduces the frequency output of the counting means to a suitable frequency level for actuating time display means.*

The present invention relates to a timepiece the time-measuring functions of which are carried out exclusively in an electronic manner.

So-called electronic or electric watches are known, but the use of the terms "electronic" or "electric" in connection therewith is in some respects misleading. The power source which is used may be electric, and some electronic circuitry may be involved, but in the last analysis the actual timekeeping functions are performed by mechanically moving parts, such as the tines of a tuning fork, the rotor of an electric motor, or a hair spring-biased balance wheel. The existence of these mechanically moving elements greatly limits or controls the size and shape of the timepiece, renders the mechanism susceptible to damage from vibration or shock, and makes accuracy of time measurement dependent upon the position or [attitude] *altitude* of the timepiece, or variations in temperature, the degree to which the moving parts are lubricated, and the degree to which the moving parts may become worn.

It is the prime object of the present invention to devise a timepiece in which the time-measuring function is carried out without any moving parts, and in a completely electronic fashion, thereby to eliminate balance wheels, tuning forks and the like. Moving parts may be employed for time display (although even this is not essential), but the movement of those parts (e.g. hands) to appropriate time display position is accomplished in a manner which has no effect on the accuracy of the time measurement itself.

It is a further prime object of the present invention to carry out the aforementioned all-electronic time measurement functions in a reliable and accurate fashion, while at the same time utilizing so little energy from a battery or other electrical source as to render the system capable of being used in small timepieces such as wrist watches.

It is a further prime object of the present invention to achieve such all-electronic time measurement in a fashion which does not require the sequential opening and closing of contacts, so that the accuracy of time measurement will not be dependent upon the maintenance of contact surfaces in an optimum condition.

It is a further object of the present invention to utilize as a source of time measurement in a conventional timepiece such as a clock or wristwatch a radioactive substance having known radioactivity emission characteristics.

The basic operation of the timepiece of the present invention is dependent on the fact that radioactive substances emit certain types of particles or rays at known statistical rates which vary in known fashion as the substances age. The actual rate of radioactive emission will vary from instant to instant in a random fashion, but the average number of emissions in a given short period of time is quite uniform. While the rate of emissivity decreases with the age of the substance, such decrease, for many known substances, is exceedingly slight. This phenomenon of lower emissivity with age is generally expressed in terms of the "half life" of the substances, i.e., the length of time that it will take for any given emissivity rate to be cut in half. Many radioactive materials have very long half lives, measured in terms of thousands or even millions of years, and with such substances the average number of radioactive emissions for a given time interval will not vary appreciably over a large number of years. They thus provide a sufficiently stable emissivity rate as to be useable in the systems of the present invention.

It is necessary, of course, in connection with timepieces which are to be worn or carried by a person, that the radiation in question not be harmful. Fortunately, there are radioactive substances having half lives which are appropriately large whose radioactive emissivity is exclusively in the form of electrons or beta rays. Such radioactivity cannot penetrate a thin conventional watchcase, or even the skin of an individual, and hence the use of such materials would be entirely safe.

In accordance with the present invention, means are provided for counting the individual radioactive emissions from a predetermined amount of an appropriate radioactive substance. These emissions occur at a known nominal frequency, and the random statistical variations from that nominal frequency from one instant to another cancel themselves out over time periods on the order of seconds or moderately large fractions of seconds. Hence the accuracy of the time indication of the timepiece will be satisfactory and practical. It is an interesting feature of the system of the present invention that, within limits, a desired degree of accuracy of time indication can be achieved by selecting an appropriate initial counting frequency, as by permitting a greater or lesser amount of the radiations to reach the counting means, or by electronically selecting only radiation events having at least a predetermined energy level.

The output of the counting means, which is at a high frequency in order to produce a desired degree of accuracy, is then translated, preferably by appropriate electronic circuitry, into a lower frequency which is a known multiple of the frequency of the counting means output. For example, and as here specifically disclosed, the counter output may be at the rate of 16,384 pulses per second ($2^{14}$), while the ultimate operative output may be at the rate of one pulse per second. This ultimate output can be employed to actuate the indication means in any desired manner, as by means of solenoid actuation. Alternatively, a higher ultimate output such as 32 pulses per second could be used to energize a synchronous motor, such as one of the hysteresis type, the motor in turn being connected to gearing which drives conventional clock or watch hands. Alternatively, the pulse outputs, at an appropriate frequency, could be used to appropriately energize an electronic display device, such as one comprising a matrix of silicon junctions which glow when appropriately energized, which junctions could be employed to selectively illuminate indicia representing seconds, minutes and hours.

From the above it will be seen that the time-measuring function is carried out exclusively by providing a radioactive source, counting all or a certain proportion of the radioactive emissions in an electronic fashion, and converting the count frequency to a more useable lower frequency, again entirely by electronic means. The counting devices and count-dividing circuitry are all well known in the art and are capable of being incorporated into physical structures which are exceedingly small and which, therefore, can be used in connection with timepiece structures of very small size. Indeed, because of the electronic nature of the system it is not even essential that all of the circuitry be contained within the watchcase; for example, the count-dividing circuitry could be made a part of a wristwatch band or strap. The timekeeping functions will be carried out in a highly accurate and reliable manner virtually independently of any extraneous conditions such as vibration, shock, temperature, and the like.

To the accomplishment of the above, and to such other objects as may hereinafter appear, the present invention relates to an electronic timepiece as defined in the appended claims, and as described in this specification, taken together with the accompanying drawings, in which:

Figure 2:
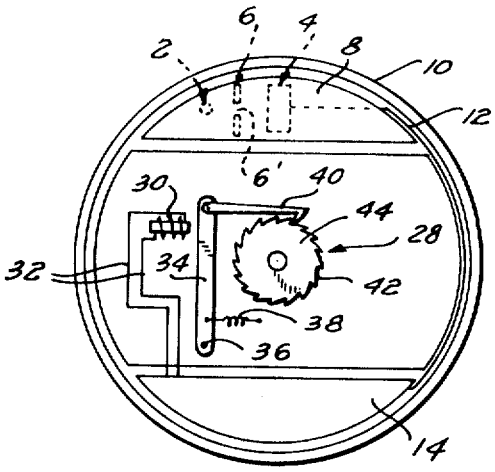
FIG. 2 is a plan view, on an enlarged scale, taken horizontally through the watch case of FIG. 1 and illustrating a typical location of the various electronic and mechanical parts for a solenoid-ratchet driven embodiment.
Figure 3:
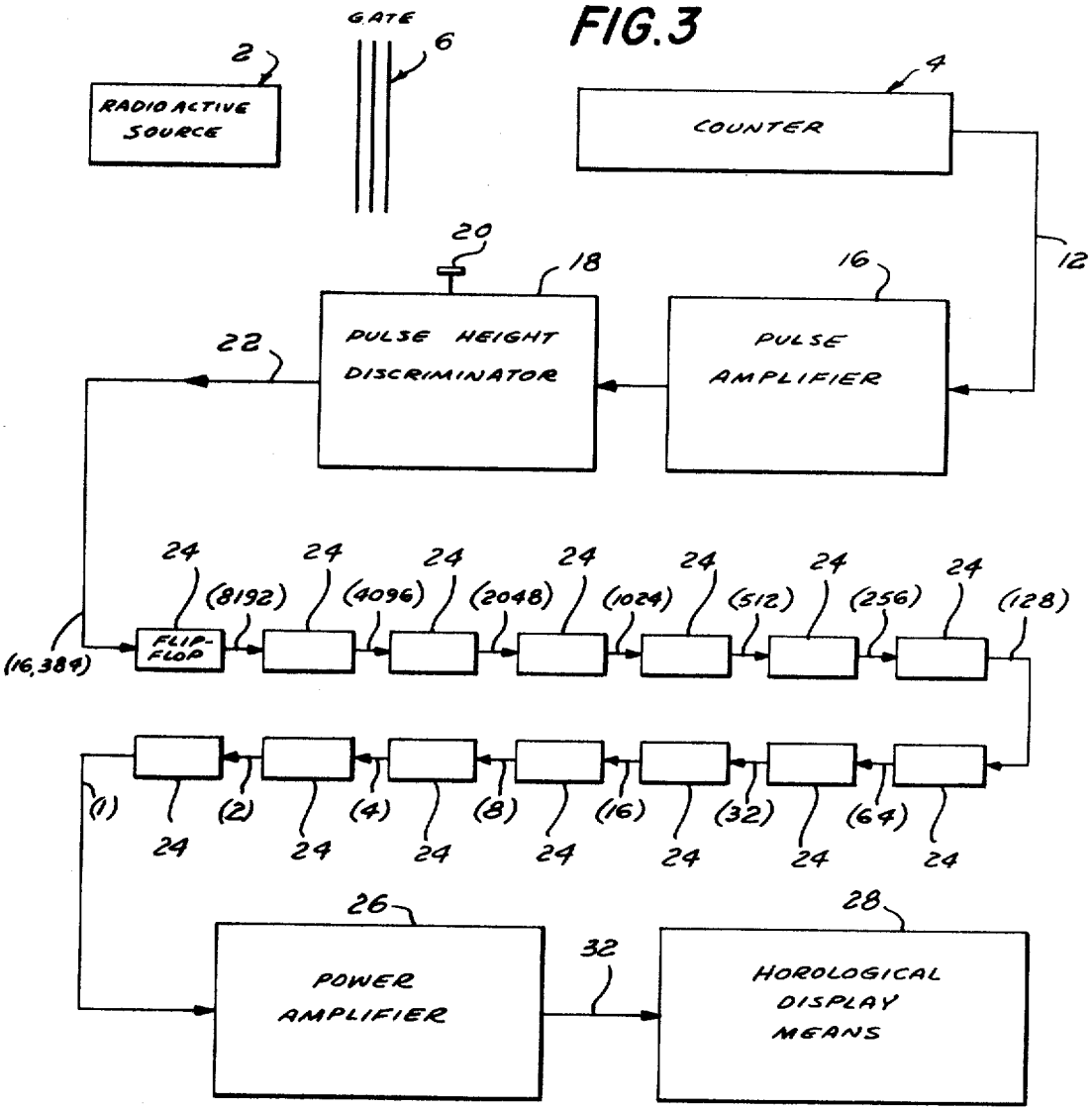
FIG. 3 is a block diagram illustrating one embodiment of the timepiece system having a mechanical time display.

Having reference first to FIG. 3, the heart of the time measurement system comprises a radioactive source 2 which is in radioactive-emission communication with a counting device 4, preferably of solid state nature. A gate 6 is interposed between the source 2 and the counter 4 in order to control the proportion of the total number of radioactive events emanating from the source 2 which reach the counter 4. As indicated in FIG. 2, these three elements may be enclosed within a casing 8 to define what could be termed the radioactive subassembly, that subassembly being housed within a portion of a watchcase 10 or the like. The casing 8 should be of such material and thickness as to be capable of containing all radioactivity within itself, and shielding its surroundings from any undesirable effects.

The electrical output from the counter 4, which will consist of a number of pulses occurring at a frequency corresponding to the frequency of radioactive events sensed by the counter 4, is conveyed by electrical connection 12 to accessory circuitry which may be housed within the casing 14 shown in FIG. 2. This circuitry may comprise a pulse amplifier 16 to ensure an average pulse magnitude of, for example, 0.5 mv. The output of the amplifier 16 is connected to a pulse height discriminator 18 preferably provided with an adjustment, schematically indicated at 20, which provides for variation in the amplitude of the pulses which are permitted to pass through the discriminator 18 and appear at its output 22. Through appropriate choice of the amount of radioactive material 2 present, adjustment or design of the gate 6, and appropriate adjustment of the pulse height discriminator 18, the frequency of the pulses in the output 22 can be controlled so that said frequency will statistically correspond, over all but the most minute periods of time, to a predetermined nominal value, such as 16,384 pulses per second. (The term "pulse" is here used in a generic fashion, and comprises any sensible cyclic variation in electrical output.)

The output 22 from the discriminator 18, at a known nominal frequency as indicated, is then passed through a series of preferably transistorized binary counters or flip-flops 24, here shown as fourteen in number, all connected in series with one another. Since each of the stages 24 is bi-stable each has an output pulse frequency which is one-half of its input pulse frequency. Thus if, as indicated, the input to the first flip-flop stage 24 has a frequency of 16,384 pulses per second, the input to the second stage will have a frequency of 8,192 cycles per second, the input to the third stage will have a frequency of 4,096 cycles per second, and so on, as indicated by the numbers in parenthesis in FIG. 3, until the output of the last flip-flop stage 24 has a pulse frequency of, for example, one per second. This output may, if necessary, be fed to a power amplifier 26, and the output from the amplifier 26 is fed to and drives a horological display means 28. In FIG. 2 all of the circuitry from the pulse amplifier 16 through the power amplifier 26 is shown housed within the casing or space 14, but it will be appreciated that all or a part of it could be located elsewhere, as in a watch band or strap.

The horological display means 28 specifically shown in FIG. 2 comprises a solenoid 30 connected by wires 32 to the output of the power amplifier 26, the solenoid 30 therefore being energized and de-energized at the rate of 1 cycle per second. The solenoid is active on armature 34 pivotally mounted at 36 and spring biased to the right by spring 38. The armature 34 carries pawl 40 engageable with the ratchet teeth 42 on ratchet wheel 44. The ratchet wheel 44 is connected by any suitable gearing to the minute and hour hands 46 and 48 respectively shown in FIG. 1. It will be understood that a second hand could also be employed if desired.

Although in FIG. 3 the output frequency for the last flip-flop stage 24 is shown as 1 cycle per second, it will be appreciated that this is exemplary only. For example, if a sweep second hand where to be employed in the timepiece, the final output frequency preferably should be at least 4 pulses per second. This could be accomplished either by designing the system so that the initial frequency is greater or by eliminating the last two flip-flop sections 24 in the system shaown in FIG. 3.

Figure 4:
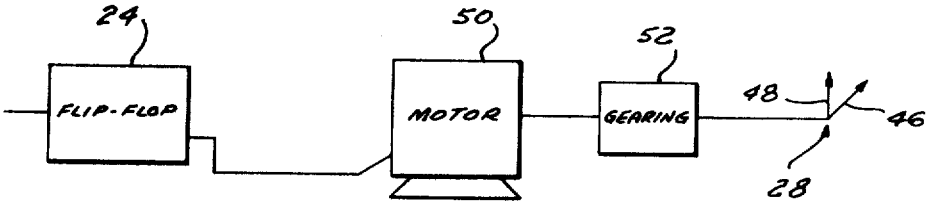
FIG. 4 is an abbreviated block diagram of an alternative embodiment having a mechanical time display.

As indicated in FIG. 4 the output from the last flip-flop circuit 24, having an appropriate frequency such as 32 pulses per second, could be used to drive a synchronous motor 50 which in turn, through appropriate gearing 52, would drive the minute and hour hands 46 and 48.

Figure 1:
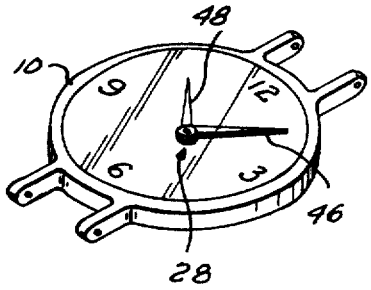
FIG. 1 is a three-quarter perspective view of a watch in which the timepiece system of the present invention is incorporated.
Figure 5:
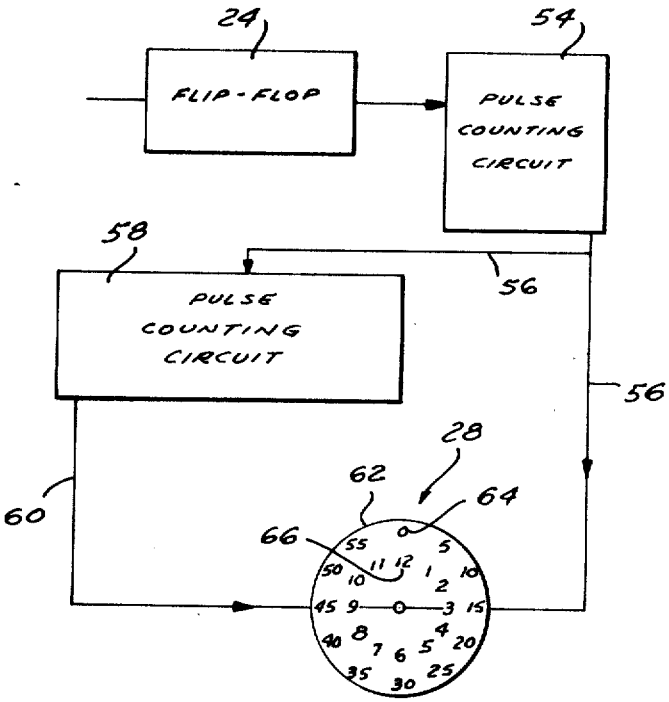
FIG. 5 is an abbreviated block diagram of yet another embodiment, this one involving an all-electronic time display.

FIG. 5 illustrates a system in which the time display itself is entirely electronic, thus differing from the embodiments of FIGS. 1–2 and 4, in which the time display means, as distinguished from the time measuring means, is mechanical in nature. In the all-electronic system of FIG. 5, the output from the last flip-flop 24, appropriately amplified as necessary, is fed to a special pulse counting circuit 54 which will have a first output 56 with a frequency of say, 1 pulse per minute. The output 56 is fed to a second pulse counting circuit 58 which will have an output 60 having a frequency of 1 pulse per hour. The outputs 56 and 60 are fed to a luminescent display panel 62 having thereon two sets of individually illuminatable display indicia, one set of indicia designated by the reference numeral 64 representing minutes and the other set of indicia designated by the reference numeral 66 representing hours. The outputs 56 and 60 respectively affect the display arrays 64 and 66. Each display array 64 and 66 may comprise a matrix of light emitting diffused siliconplanar diodes, such as those used in the light pulse array, FLPA–200, now being sold by Fairchild Semiconductor, Mountain View, Calif. Hence the appropriate numerical values of minutes and hours will be visually displayed, under control of the pulse output from the last flip-flop stage 24.

The material used for the radioactive source 2 must have a sufficiently long half life so that, during the time that it is used in the timepiece, its rate of radioactive emissivity will be accurately constant within the limits of time measurement accuracy desired. A half life of 10,000 years would appear to be a minimum value. Moreover, its radioactive emission must be of such a character as not to be harmful to persons. One radioactive element which satisfies these criteria is technetium 99, which has a half life of 500,000 years and a maximum beta energy of 292,000 electron volts. This material is commercially available, and such small amounts of it would be needed that its cost would be on the order of 1 cent per watch. Another usable substance is boron 10, which has a half life of 2,700,000 years and a beta energy of 560,000 electron volts. If 1.5 microcuries of Tc 99 is used, emission at the nominal rate of $5.5 \times 10^4$ beta rays per second will result. This rate of radiation will not vary from second to second by more than 1 part in 100, and that error is of a random nature, sometimes, being greater and sometimes being smaller than its nominal value. If no more than 20,000 beta rays per second reach the counter 4, an error of no more than 20 seconds per month in ultimate timekeeping accuracy can be expected.

The counter 4 is preferably a solid state device well known in the art under the name "lithium drifted counter" or "P-I-N counter." These solid state devices have characteristics which are extremely stable with age and draw only a few microwatts of power. One such device presently available on the market produces an output of 5 millivolts for every 1 mev. of energy lost in the counter by the particular pulse detected thereby. Since the average beta ray from Tc 99 will have about 100 kev. of energy to lose in the counter 4, the average voltage pulse output from the counter 4 will be about 0.5 millivolt, with a maximum pulse amplitude of approximately 1.5 millivolt.

The amount of radioactive material selected and the nature and design of the gate 6 may be such that the desired value of about 20,000 counts per second is realized by the counter 4. The gate 6 may comprise a wall which is not permeable to beta rays but which is provided with a window [6] *6'* (see FIG. 2) through which the beta rays may pass, or it may comprise one or more sheets of thin gold foil, as schematically indicated in FIG. 3.

Since the amplitude spectrum of the beta rays emanating from the source 2 extends virtually from zero energy to some characteristic maximum value, and since the pulse amplifier 16 will have a certain inherent noise level, it is necessary to reject those beta rays having an amplitude near or below the noise level of the amplifier. That is the function of the pulse height discriminator 18. Rejection of rays will, of course, result in reducing the number of pulses which reach the first flip-flop stage 24, and by judicious selection of the cut-off or discrimination level the pulse frequency reaching said first flip-flop stage 24 can be accurately controlled. Thus, the pulse height discriminator 20 schematically indicated in FIG. 3 will, upon initial assembly of the timepiece, be adjusted until the average frequency of the pulse output 22 will be at that rate for which the system is specifically designed (here shown as 16,384 pulses per second).

From the above it will be apparent that the timing action of the system of the present invention is entirely independent of mechanical devices. That timing action is derived from the known radioactivity emissivity rate of a substance contained within the timepiece system, which rate may vary from instant to instant in a random fashion, but which rate is highly accurately constant when averaged over even very short periods of time such as fifths or tenths of seconds. It may be shown that using an output frequency of 16,384 pulses per second, there is a 95% of probability of an error no greater than 20 seconds per month. If higher accuracy is desired, one may use a higher initial pulse rate (an initial pulse rate of 75,536 pulses per second would reduce the error by a factor of 2, but would require the addition of two more flip-flop circuits 24 in order to bring the final display-actuating pulse frequency to its desired level).

All of the operative elements involved are known, and even in the present state of the art are available in such small sizes, and with such low power requirements, as to be capable of being incorporated into timepieces even of the size of wrist watches. Since the details of individual circuitry are well known, the circuits have been here disclosed in block diagram form as is conventional.

[While but a limited number of embodiments of the present invention have been here specifically disclosed, it will be apparent that many variations may be made therein, all within the scope of the instant invention as defined in the following claims.]

*While but a limited number of embodiments of the present invention have been here specifically disclosed, it will be apparent that many variations may be made therein, all within the scope of the instant invention.*

We claim:

1. A timepiece comprising a *single* housing, a source of radioactivity in said housing, *said source having a half life of 10,000 years or more,* a radioactivity counter in said housing in radioactivity-receiving relationship with said source and having an electrical output corresponding to the rate of reception of radioactivity thereby, *said reception rate being on the order of at least 20,000 events per second,* said source and said counter being in operatively fixed relation such that the rate of reception of radioactivity by said [same] counter corresponds to the rate of emission of radioactivity from said source, control means electrically connected to said counter output so as to be actuated at a rate corresponding to said output, and time display means operatively connected to said control means so as to be driven thereby.

2. The timepiece of claim 1, in which said time display means comprises mechanically movable elements, and in which said control means comprises a mechanism operated at a frequency corresponding to the frequency of said counter output.

3. The timepiece of claim 1, in which said time display means comprises mechanically movable elements, and in which said control means comprises a step-operated mechanism operated at a step-frequency corresponding to the frequency of said counter output.

4. The timepiece of claim 1, in which said time display means comprises an electronic figure display device having hour and minute displays, said control means having an electrical output effective to control said hour and minute displays.

5. A timepiece comprising a *single* housing, a source of beta rays in said housing, *said source having a half life of 10,000 years or more,* a beta ray counter in said housing in beta ray-receiving relationship with said source and having an electrical output corresponding to the rate of reception of beta rays thereby, *said reception rate being on the order of at least 20,000 events per second,* said source and said counter being in operatively fixed relation such that the rate of reception of radioactivity by said same counter corresponds to the rate of emission of radioactivity from said source, control means electrically connected to said counter output so as to be actuated at a rate corresponding to said output, and time display means operatively connected to said control means so as to be driven thereby.

6. The timepiece of claim 5, in which said time display means comprises mechanically movable elements, and in which said control means comprises a mechanism operated at a frequency corresponding to the frequency of said counter output.

7. The timepiece of claim 5, in which said time display means comprises mechanically movable elements, and in which said control means comprises a step-operated mechanism operated at a step-frequency corresponding to the frequency of said counter output.

8. The timepiece of claim 5, in which said time display means comprises an electronic figure display device having hour and minute displays, said control means having an electrical output effective to control said hour and minute displays.

9. A timepiece comprising a *single* housing, a source of radioactivity in said housing, *said source havng a half life of 10,000 years or more,* a radioactivity counter in said housing in radioactivity-receiving relationship with said source and having a pulse output the frequency of the pulses of which correspond to the frequency of the radioactivity received by said counter, *said received frequency being on the order of at least 20,000 cycles per second,* time display means, said source and counter being in operatively fixed relation such that the rate of reception of radioactivity by said [same] counter corresponds to the rate of emission of radioactivity from said source, control means operatively connected to said time display means for driving the latter, and an electrical connection between said counter output and said control means for driving the latter at a rate corresponding to the pulse frequency of the former.

10. The timepiece of claim 9, in which said time display means comprises mechanically movable elements, and in which said control means comprises mechanism operated at a frequency the same as the output frequency of said frequency-reducing circuit means.

11. The timepiece of claim 9, in which said time display means comprises mechanically movable elements, and in which said control means comprises a step-operated mechanism operated at a step-frequency the same as the output frequency of said frequency-reducing circuit means.

12. The timepiece of claim 9, in which said time display means comprises an electronic figure display device having hour and minute displays, said control means having an electrical output effective to control said hour and minute displays.

13. A timepiece comprising a *single* housing, a source of radioactivity in said housing, said source havng a half life of *10,000 years or more,* a radioactivity counter in said housing in radioactivity-receiving relatonshp with said source and having a pulse output the frequency of the pulses of whch correspond to the frequency of the radioactivity received by said counter, *said received frequency being on the order of at least 20,000 cycles per second,* said source and said counter being in operatively fixed relation such that the rate of reception of radioactivity by said counter corresponds to the rate of emission of radioactivity from said source, time display means, control means operatively connected to said time display means for driving the latter, and an electrical connection between said counter output and said control means for driving the latter at a rate corresponding to the pulse frequency of the former, said electrical connection comprising a frequency-reducing circuit means effective to have an output frequency which is a predetermined fraction of the pulse frequency of said counter output.

14. A time piece comprising a *single* housing, a source of radioactivity in said housing, *said source having a half life of 10,000 years or more,* a radioactivity counter in said housing in radioactivity-receiving relationship with said source and having a pulse output the frequency of the pulses of which correspond to the frequency of the radioactivity received by said counter, *said received frequency being on the order of at least 20,000 cycles per second,* said source and said counter being in operatively fixed relation such that the rate of reception of radioactivity of said [same] counter corresponds to the rate of emission of radioactivity from said source, time display means, control means operatively connected to said time display means for driving the latter, and an electrical connection between said counter output and said control means for driving the latter at a rate corresponding to the pulse frequency of the former, said electrical connection comprising means for rejecting all pulses the magnitude of which fall outside a predetermined range, and a frequency-reducing circuit means effective to have an output frequency which is a predetermined fraction of the pulse frequency of said counter output.

15. A timepiece comprising a *single* housing, a source of beta rays in said housing, *said source having a half life of 10,000 years or more,* a beta ray counter in said housing in beta ray-receiving relationship with said source and having a pulse output the frequency of the pulses of which correspond to the frequency of the beta rays received by said counter, *said received frequency being on the order of at least 20,000 cycles per second,* said source and said counter being in operatively fixed relation such that the rate of reception of radioactivity by said [same] counter corresponds to the rate of emission of radioactivity from said source, time display means, control means operatively connected to said time display means for driving the latter, and an electrical connection between said counter output and said control means for driving the latter at a rate corresponding to the pulse frequency of the former.

16. The timepiece of claim 15, in which said time display means comprises mechanically movable elements, and in which said control means comprises mechanism operated at a frequency the same as the output frequency of said frequency-reducing circuit means.

17. The timepiece of claim 15, in which said time display means comprises an electronic figure display device having hour and minute displays, said control means having an electrical output effective to control said hour and minute displays.

18. A timepiece comprising a *single* housing, a source of beta rays in said housing, *said source having a half life of 10,000 years or more,* a beta ray counter in said housing in beta ray-receiving relationship with said source and having a pulse output the frequency of the pulses of which correspond to the frequency of the beta rays received by said counter, *said received frequency being on the order of at least 20,000 cycles per second,* said source and said counter being in operatively fixed relation such that the rate of reception of radioactivity by said [same] counter corresponds to the rate of emission of radioactivity from said source, time display means, control means operatively connected to said time display means for driving the latter, and an electrical connection between said counter output and said control means for driving the latter at a rate corresponding to the pulse frequency of the former, said electrical connection comprising a frequency-reducing circuit means effective to have an output frequency which is a predetermined fraction of the pulse frequency of said counter output.

19. A timepiece comprising a *single* housing, a source of beta rays in said housing, *said source having a half life of 10,000 years or more,* a beta ray counter in said housing in beta ray-receiving relationship with said source and having a pulse output the frequency of the pulses of which correspond to the frequency of the beta rays received by said counter, *said received frequency being on the order of at least 20,000 cycles per second,* said source and said counter being in operatively fixed relation such that the rate of reception of radioactivity by said [same] counter corresponds to the rate of emission of radioactivity from said source, time display means, control means operatively connected to said time display means for driving the latter, and an electrical connection between said counter output and said control means for driving the latter at a rate corresponding to the pulse frequency of the former, said electrical connection comprising means for rejecting all pulses the magnitude of which fall outside a predetermined range, and a frequency-reducing circuit means effective to have an output frequency which is a predetermined fraction of the pulse frequency of said counter output.

20. The timepiece of claim 19, in which said time display means comprises mechanically movable elements, and in which said control means comprises mechanism operated at a frequency the same as the output frequency of said frequency-reducing circuit means.

References Cited

The following references, cited by the Examiner, are of record in the patented file of this patent or the original patent.

UNITED STATES PATENTS 3,194,003 7/1965 Polin ---------- 58—50

FOREIGN PATENTS 771,823 4/1957 Great Britain.

RICHARD B. WILKINSON, Primary Examiner

E. C. SIMMONS, Assistant Examiner

U.S. Cl. X.R.

58—50; 250—83.3